(12) United States Patent
Pavel et al.

(10) Patent No.: US 8,095,697 B2
(45) Date of Patent: *Jan. 10, 2012

(54) ORIENTATION MEASUREMENT TOOL FOR SEISMIC DATA ACQUISITION

(75) Inventors: Dennis R. Pavel, Highland Village, TX (US); Scott T. Hoenmans, Arvada, CO (US); Andrew Bull, West Lothian (GB); Chris Green, Edinburgh (GB)

(73) Assignee: INOVA Ltd., George Town, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 12/795,193

(22) Filed: Jun. 7, 2010

(65) Prior Publication Data

US 2010/0332688 A1 Dec. 30, 2010

Related U.S. Application Data

(63) Continuation of application No. 11/864,434, filed on Sep. 28, 2007, now Pat. No. 7,734,838.

(60) Provisional application No. 60/848,202, filed on Sep. 29, 2006.

(51) Int. Cl.
*G06F 3/00* (2006.01)
*G01V 1/00* (2006.01)
(52) U.S. Cl. .................. 710/8; 710/10; 702/14
(58) Field of Classification Search .............. 710/8, 10; 702/14
See application file for complete search history.

(56) References Cited

U.S. PATENT DOCUMENTS 6,002,641 A * 12/1999 Chien ............... 367/58
6,353,577 B1 * 3/2002 Orban et al. ........... 367/43

* cited by examiner

*Primary Examiner* — Alford Kindred
*Assistant Examiner* — David Martinez
(74) *Attorney, Agent, or Firm* — Mossman, Kumar & Tyler, PC

(57) ABSTRACT

An apparatus for in-field configuration of a seismic device such as a seismic sensor may include a memory module having data for configuring the seismic device, a location sensor determining a location parameter for the seismic sensor, an alignment member aligning the location sensor with the seismic sensor, and a communication device transmitting the determined location parameter to a selected external device.

20 Claims, 5 Drawing Sheets

ORIENTATION MEASUREMENT TOOL FOR SEISMIC DATA ACQUISITION

CROSS-REFERENCE TO RELATED APPLICATIONS

This application is a continuation of U.S. application Ser. No. 11/864,434, entitled "Configuration Tool and Methods For Seismic Data Acquisition" filed on Sep. 28, 2007, which claims the benefit of expired U.S. Provisional application 60/848,202 filed on Sep. 29, 2006. This application is related to U.S. patent application Ser. No. 10/664,566, filed on Sep. 17, 2003 title "Single Station Wireless Seismic Data Acquisition Method and Apparatus," now abandoned, which is hereby incorporated by reference for all purposes.

BACKGROUND OF THE DISCLOSURE

Oil companies conduct seismic surveying to lower risk and to reduce costs of locating and developing new oil and gas reserves. Seismic surveying is, therefore, an up front cost with intangible return value. Consequently minimizing the cost of seismic surveying and getting quality results in minimum time are important aspects of the seismic surveying process.

Seismic surveys are conducted by deploying a large array of seismic sensors over a terrain of interest. These arrays may cover over 50 square miles and may include 2000 to 5000 seismic sensors. An energy source such as buried dynamite may be discharged within the array to impart a shockwave into the earth. The resulting shock wave is an acoustic wave that propagates through the subsurface structures of the earth. A portion of the wave is reflected at underground discontinuities, such as oil and gas reservoirs. These reflections are then sensed at the surface by the sensor array and recorded as seismic data. Such sensing and recording are referred to herein as seismic data acquisition. This seismic data is then processed to generate a three dimensional map, or seismic image, of the subsurface structures. The map may be used to make decisions about drilling locations, reservoir size and pay zone depth.

Seismic data acquisition systems may include a relatively large number of seismic data acquisition units. These seismic data acquisition units may need to be configured in a particular manner in order to properly acquire seismic data. The present disclosure addresses the need for in-field configuration of seismic data acquisition units.

SUMMARY OF THE DISCLOSURE

In aspects, the present disclosure provides an apparatus for configuring a seismic device positioned in a geographical area of interest. In one embodiment, the apparatus includes data associated with the seismic device, a memory module configured to store the data, a processor configured to retrieve the data from the memory module, and a communication device operatively coupled to the processor. The communication device may be configured to transmit the retrieved data to the seismic device. In embodiments, the data may include: a configuration file, an acquisition parameter, and/or an operational parameter. In embodiments, the data may include processor executable instructions. In one aspect, the seismic device may be a sensor station, and the communication device may be configured to transmit the retrieved data to the sensor station. In aspects, the apparatus may include at least one location sensor that determines at least one location parameter for the seismic device. Exemplary location parameters include, but are not limited to: an x-coordinate, a y-coordinate, elevation, z-coordinate, inclination, tilt and/or azimuth. The processor may communicate with the at least one location sensor to received the measured location parameter(s). In arrangements, the at least one location sensor may be: an orientation sensor; a compass, or a GPS device. In embodiments, the apparatus may include an alignment member receiving the at least one location sensor. The alignment member may be configured to align the at least one location sensor with the seismic device. In embodiments, the apparatus may include a hand-held device configured to receive the memory module and/or the processor. The communication device may use: a wireless transmission media and/or one or more wires.

In aspects, the present disclosure provides a method for configuring a seismic device in the field. One exemplary method includes positioning the seismic device in a geographical area of interest; and configuring the seismic device using data associated with the seismic device. The data for configuring the seismic device may include: a configuration file, an acquisition parameter, and/or an operational parameter. In embodiments, the data may include processor executable instructions. In aspects, the seismic device may be a sensor station.

The method may also include determining at least one location parameter for the seismic device; and transmitting the determined at least one location parameter to the seismic device. The at least one location sensor may be: an orientation sensor, a compass, or a GPS device. The method may include aligning the at least one location sensor with the seismic device. In embodiments, the method may further include transporting a processor to the geographical area of interest, the processor being programmed to configure the seismic device, and positioning the processor proximate to the seismic device. In embodiments, the method may also include transporting a memory module to the geographical area of interest, the memory module including the data associated with the seismic device. The method may further include using: a wireless media and/or one or more wires to transmit data.

In aspects, the present disclosure provides methods and devices provide accurate measurements of a specified orientation, position or coordinate for seismic devices such as sensor units. In one aspect, the present disclosure provides orientation measurement systems and devices for determining one or more parameters of interest associated with a seismic sensor. These parameters may include location parameters such as latitude, longitude, azimuth, inclination/tilt and elevation. In one embodiment, an orientation measurement tool performing such a function includes a location sensor that measures one or more location parameters for the seismic sensor and an alignment member that aligns the location sensor with the seismic sensor. Exemplary location sensors include compasses and GPS devices. The location parameter measurements made by the location sensor are transmitted via a communication device to a selected external device. The external device may be a processor positioned in a hand-held device received by the alignment member. In such an arrangement, the processor can include a communication device that transmits location parameters to a sensor station associated with the seismic sensor. In other arrangements, the location sensor can communicate directly with the sensor station associated with the seismic sensor.

In embodiments, the orientation measurement tool can be formed as a generally tubular member that has a pod removably connected at one end. The pod may be formed to receive the location sensor and other associated devices such as a power source and data transmission device. The pod when removed from the tubular member can be worn by a user, and/or mounted on a vehicle. The communication devices can use either a wireless transmission media or data conductors such as metal wires or optical fibers.

It should be understood that examples of the more important features of the disclosure have been summarized rather broadly in order that detailed description thereof that follows may be better understood, and in order that the contributions to the art may be appreciated. There are, of course, additional features of the disclosure that will be described hereinafter and will form the subject of the claims appended hereto.

BRIEF DESCRIPTION OF THE DRAWINGS

The novel features of this disclosure, as well as the disclosure itself, will be best understood from the attached drawings, taken along with the following description, in which similar reference characters refer to similar parts, and in which.

DETAILED DESCRIPTION OF THE DISCLOSURE

Figure 1:
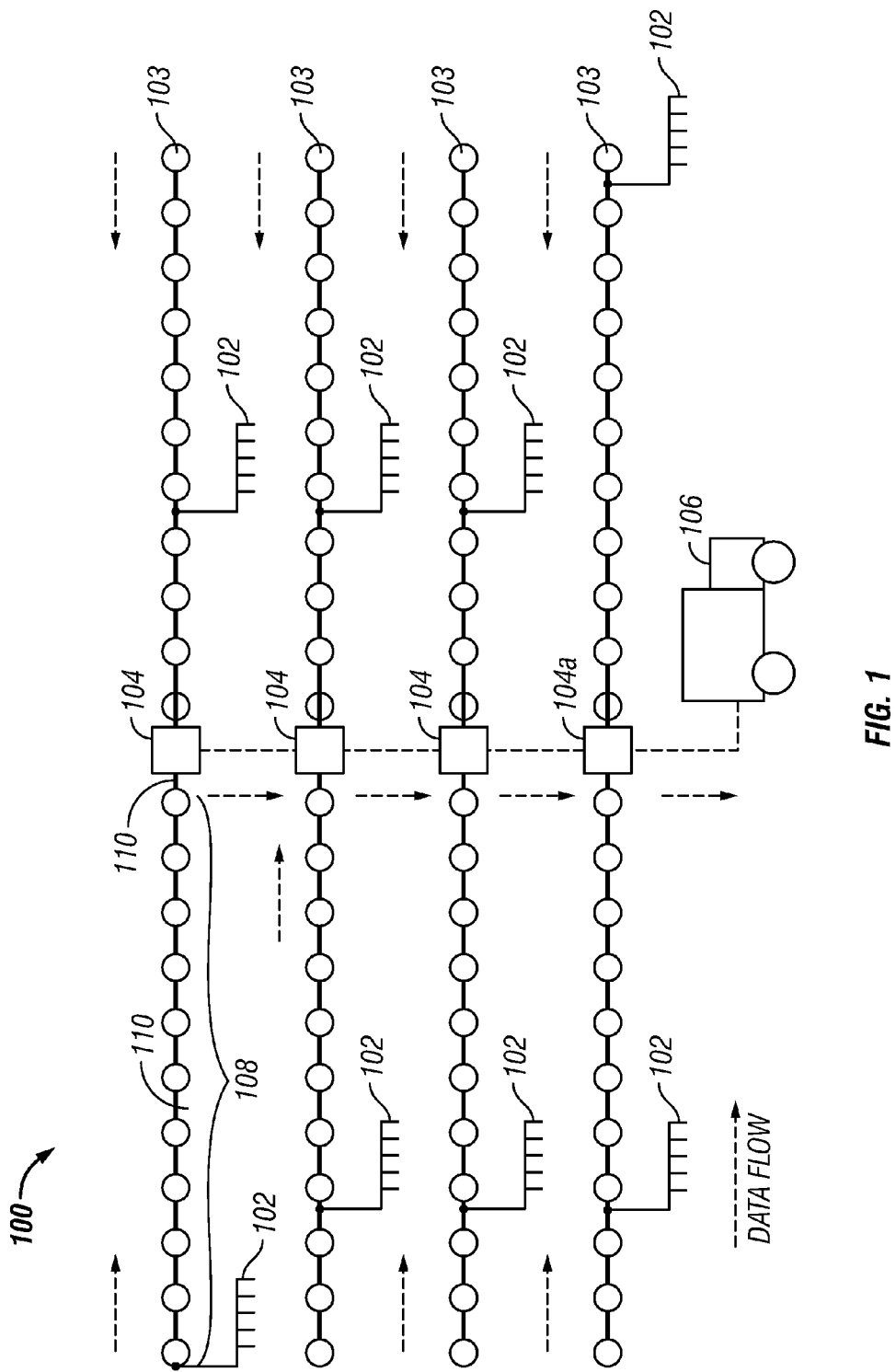
FIG. 1 schematically illustrates a cable seismic data acquisition system.

In aspects, the present disclosure relates to devices and methods for determining location parameters for seismic devices used during seismic data acquisition and/or configuring seismic devices in the field. The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein.

FIG. 1 depicts a typical cable-based seismic data acquisition system 100. The typical system 100 includes an array (string) of spaced-apart seismic sensor units 102. Each string of sensors is typically coupled via cabling to a data acquisition device (field box) 103, and several data acquisition devices and associated string of sensors are coupled via cabling 110 to form a line 108, which is then coupled via cabling 110 to a line tap or (crossline unit) 104. Several crossline units and associated lines are usually coupled together and then to a central controller 106 housing a main recorder (not shown). One sensor unit 102 that is in use today is a velocity geophone used to measure acoustic wave velocity traveling in the earth. Other sensor units 102 that may be used are acceleration sensors (accelerometers) for measuring acceleration associated with the acoustic wave. In embodiments, each sensor unit may comprise a single sensor element or more than one sensor element for multi-component seismic sensor units.

The sensors 102 are usually spaced at least on the order of tens of meters, e.g., 13.8-220.0 feet. Each of the crossline units 104 may perform some signal processing and then store the processed signals as seismic information for later retrieval. The crossline units 104 are each coupled, either in parallel or in series with one of the units 104a serving as an interface with between the central controller 106 and all crossline units 104.

Figure 2:
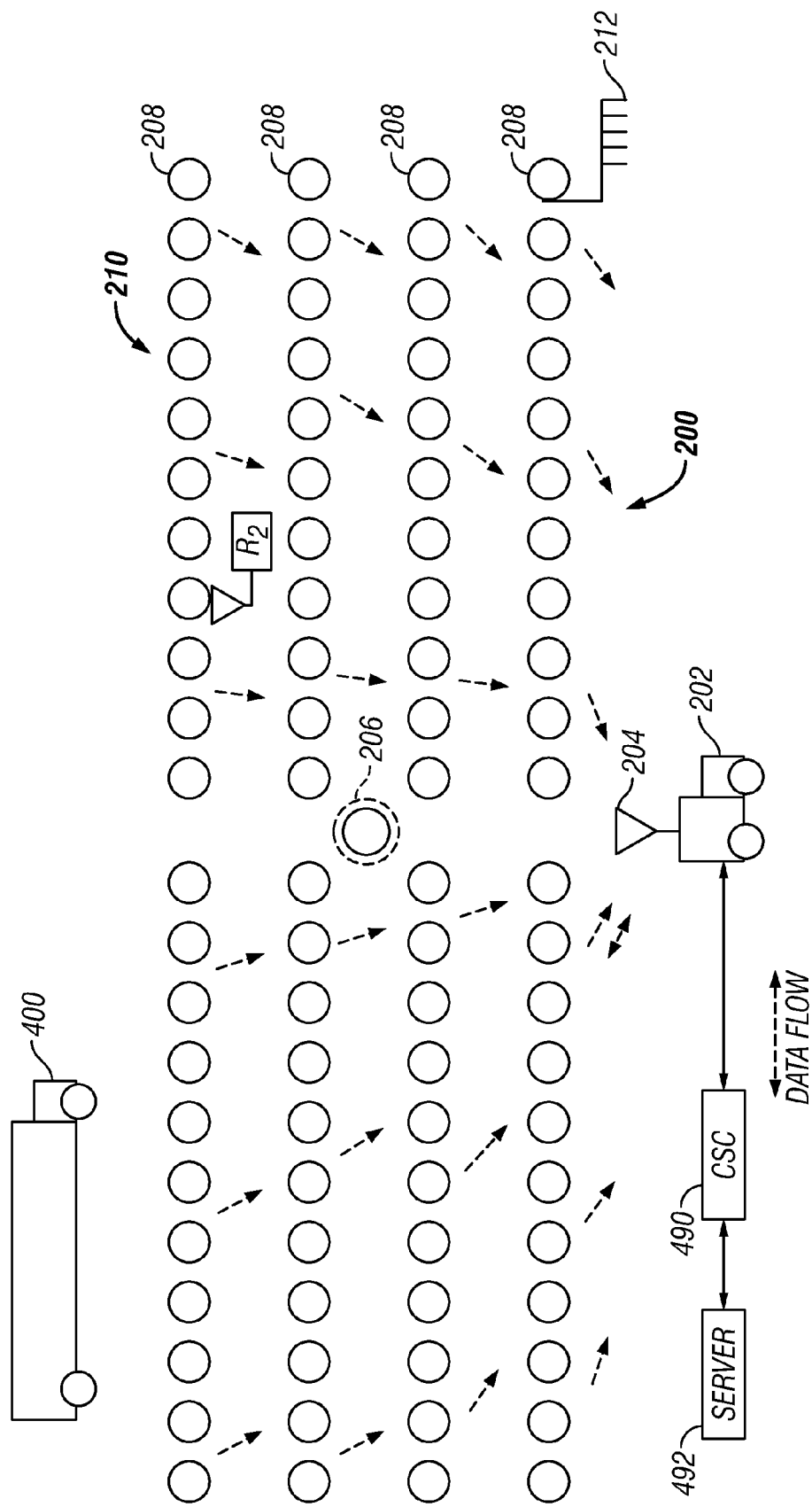
FIG. 2 schematically illustrates a wireless seismic data acquisition system.

Referring to FIG. 2 there is schematically shown a wireless seismic data acquisition system. The system 200 includes a central controller 202 in direct communication with each of a number of wireless sensor stations 208 forming an array (spread) 210 for seismic data acquisition. Each sensor station 208 may include one or more sensors 212 for sensing seismic energy. Direct communication as used herein refers to individualized data flow as depicted in FIG. 2 by dashed arrows. The data flow may be bi-directional to allow one or more of: transmitting command and control instructions from the central controller 202 to each wireless sensor station 208; exchanging quality control data between the central controller 202 and each wireless sensor station 208; and transmitting status signals, operating conditions and/or selected pre-processed seismic information from each wireless sensor station 208 to the central controller 202. The communication may be in the form of radio signals transmitted and received at the central controller 202 via a suitable antenna 204. The term "seismic devices" includes any device that is used in a seismic spread, including, but not limited to, sensors, sensor stations, receivers, transmitters, power supplies, control units, etc. As used herein the term "wireless" or "cableless" is intended to describe arrangement wherein communication or data transfer between a sensor station 208 and a central controller 202 does not utilize wire conductors. There can be, of course, cables and wires that connecting the sensor station 208 and local components such as the sensing devices or external batteries. Thus, in general, a wireless or cableless seismic device is one that does not utilize wires or cables to communicate with a central control unit. In one embodiment, each sensor station 208 has a single sensor and a cable connected between one station and one sensor.

The controller 202, the central station computer (CSC) 490 and a central server 492 exert control over the constituent components of the system 200 and direct both human and machine activity during the operation of the system 200. The server 492 can be programmed to manage data and activities over the span of the seismic campaign, which can include daily shooting sequences, updating the shots acquired, tracking shooting assets, storing seismic data, pre-processing seismic data and broadcasting corrections. Of course, a single controller can be programmed to handle most if not all of the above described functions. For example, the CSC 490 can be positioned in or integral with the controller 202. Moreover, in some applications it may be advantageous to position the controller 202 and CSC 490 in the field, albeit in different locations, and the server 492 at a remote location.

Figure 3A:
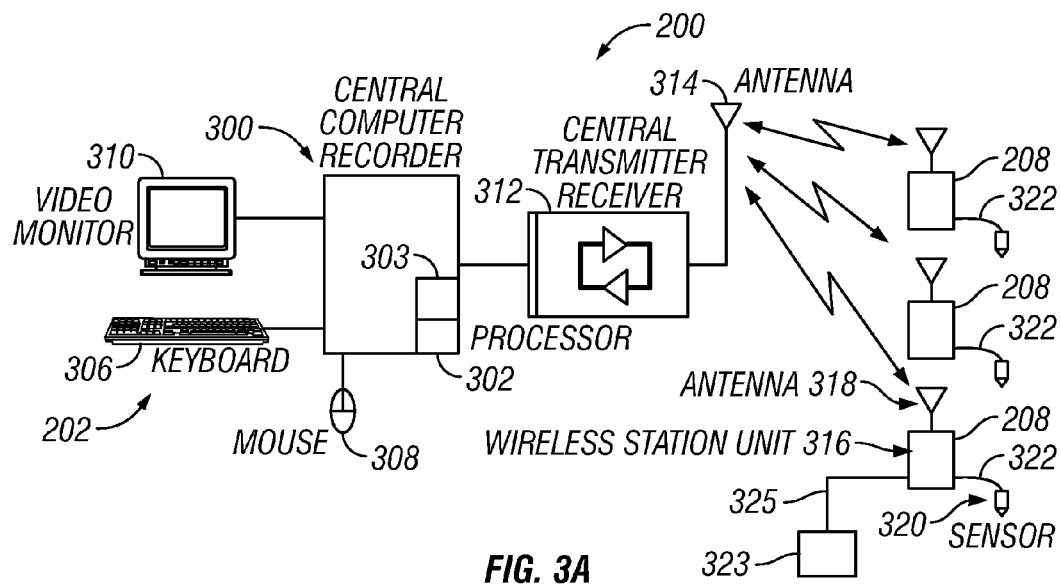
FIG. 3A shows a schematic representation of the system of FIG. 2 in more detail.

FIG. 3A is a schematic representation of the system 200 in more detail. The central controller 202 includes a computer 300 having a processor 302 and a memory 303. An operator can interface with the system 200 using a keyboard 306 and mouse or other input 308 and an output device such as a monitor 310. Communication between remotely-located system components in the spread 210 and the central controller 202 is accomplished using a central transmitter-receiver (transceiver) unit 312 disposed in the central controller 202 along with an antenna 314.

Figure 3B:
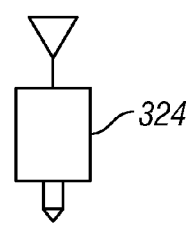
FIG. 3B shows one embodiment of a wireless station unit having an integrated seismic sensor.

The central controller 202 communicates with each wireless sensor station 208. Each wireless sensor station 208 shown includes a wireless station unit 316, an antenna 318 compatible with the antenna 314 used with the central controller 202, and a sensor unit 320 responsive to acoustic energy traveling in the earth co-located with a corresponding wireless sensor station. Co-located, as used herein, means disposed at a common location with one component being within a few feet of the other. Therefore, each sensor unit 320 can be coupled to a corresponding wireless station unit by a relatively short cable 322, e.g., about 1 meter in length, or coupled by integrating a sensor unit 320 with the wireless station unit 316 in a common housing 324 as shown in FIG. 3B. In certain situations, the expected in-field service time may exceed the power capacity of internal battery sources (e.g., battery 422 of FIG. 4). In certain embodiments, an external battery 323 can be connected to the sensor station 208 via a suitable cable 325. The external battery 323 increases the amount of power available to the sensor station 208 and thereby increases the in-field service life of the sensor station 208.

Figure 3C:
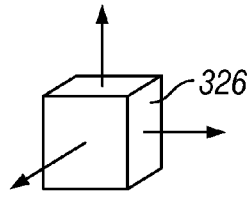

One sensor for use in a sensor unit 320 may be a multicomponent sensor 326 as shown in FIG. 3C. The multicomponent sensor shown includes a three-component accelerometer sensor incorporating micro electro-mechanical systems (MEMS) technology and application-specific integrated circuits (ASIC) as found in the Vectorseis sensor module available from Input/Output, Inc., Stafford, Tex. The present disclosure, however, does not exclude the option of using velocity sensors such as a conventional geophone or using a pressure sensor such as a conventional hydrophone. Any sensor unit capable of sensing seismic energy will provide one or more advantages of the present disclosure. Furthermore, the present disclosure is useful using a single sensor unit 320 as shown, or the sensor unit 320 might include multiple sensors connected in a string.

Figure 4:
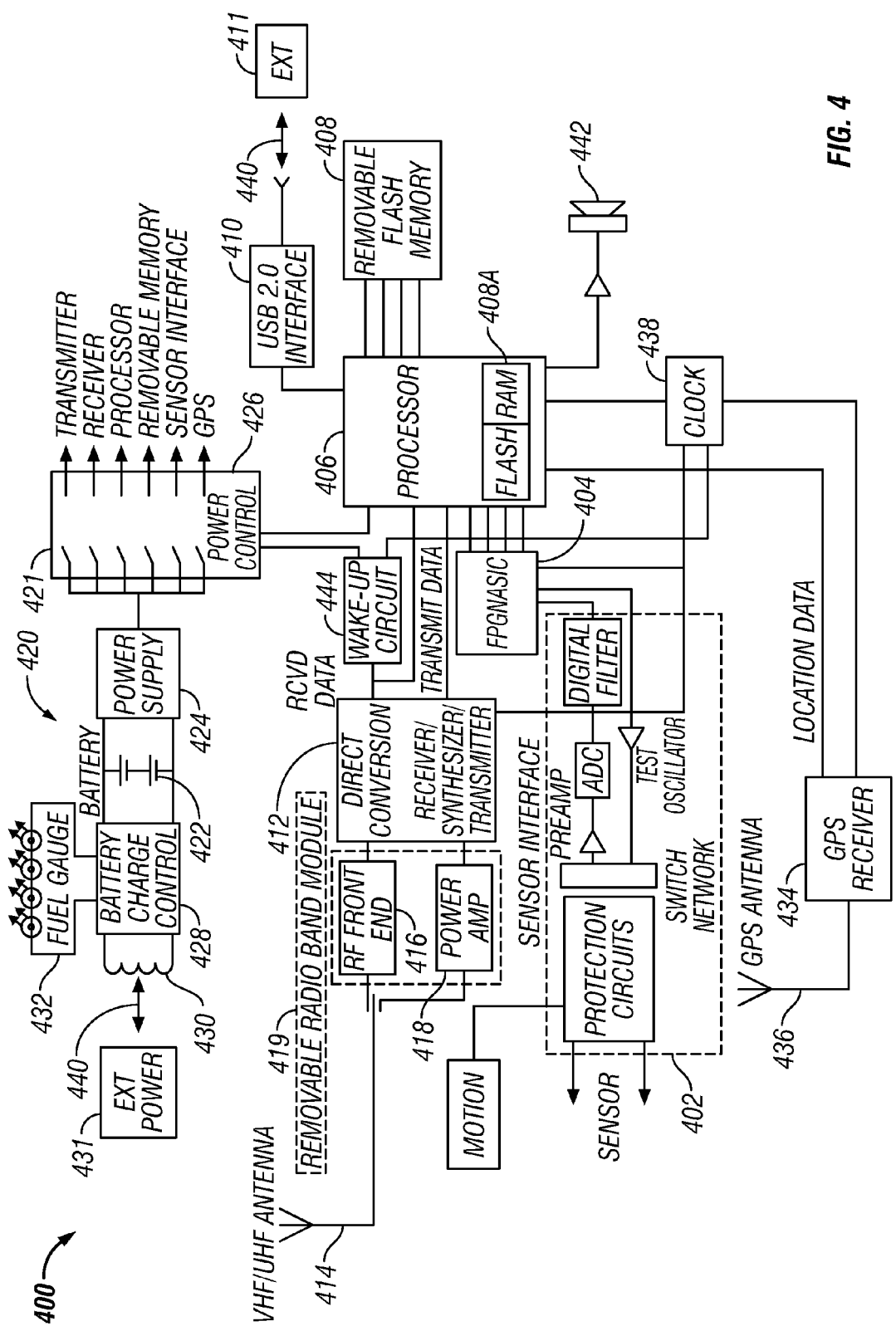
FIG. 4 is a schematic representation of a wireless station unit incorporating circuitry to interface with an analog output sensor unit.

FIG. 4 is a schematic representation of a wireless station unit 400 according to the present disclosure that operates as a data recorder incorporating circuitry to interface with an analog output sensor unit (not shown). The wireless station unit 400 is an acquisition device that includes a sensor interface 402 to receive an output signal from the sensor unit. The sensor interface 402 shown includes a protection circuit, switch network, a preamplifier, a test oscillator, and ADC and digital filtering circuits to pre-process the received signal. The sensor interface 402 is controlled in part by a field programmable gate array (FPGA) and/or an ASIC controller circuit 404. An on-board local processor 406 processes the signal to create storable information indicative of the seismic energy sensed at the sensor unit. The processor 406 may also include software, algorithms, and instructions for performing any required task. Moreover, the processor 406 may be configured to utilize configuration data files or other uploadable files that instruct the processor 406 to operate in a specified manner; e.g., during data acquisition. Such configuration data files will be discussed in greater detail below. The information can be in digital form for storage in a storage device 408, also referred to herein as a memory unit. The memory unit can be removable as shown at 408 and/or dedicated 408a with a coupling 410 for providing access to the stored information and/or for transferring the stored information to an external storage unit 411. The coupling 410 may be a cable coupling as shown or the coupling might be an inductive coupling or an optical coupling. Such couplings are known and thus are not described in detail. The memory 408, 408a can be a nonvolatile memory of sufficient capacity for storing information for later transfer or transmission. The memory might be in the form of a memory card, removable miniature hard disk drive, an Electrically-Erasable Programmable Read Only Memory (EEPROM) or the like.

Interface with the central controller 202 is accomplished with a communication device such as an on-board transmitter-receiver circuit 412, and an antenna 414 selected for the desired transmitting/receiving frequency to provide direct communication with the remotely-located central controller 202. The transmitter/receiver circuit 412 shown is a direct conversion receiver/synthesizer/transmitter circuit and can alternatively be implemented as software defined radio transceiver. Alternatively, the transmitter/receiver circuit 412 might be any suitable circuit providing transceiver functions such as a transceiver utilizing superheterodyne technology, for example. Location parameters (e.g., latitude, longitude, azimuth, inclination, azimuth, etc.) associated with a particular wireless sensor station help to correlate data acquired during a survey. These parameters are determined prior to a survey using a selected sensor location and nominal sensor orientation and the parameters can be adjusted according to the present disclosure. The location parameters are stored in a memory 303, 408 either in the central controller or in the station unit 400. In one embodiment, the wireless sensor station includes a global positioning system (GPS) receiver 434 and associated antenna 436. The GPS receiver in this embodiment is shown coupled to the processor 406 and to a clock circuit 338 to provide location parameters such as position and location data for correlating seismic information and for synchronizing data acquisition.

Local power is provided by a power supply circuit 420 that includes an on-board rechargeable battery 422. The battery 422 might be of any suitable chemistry and might be nickel-metal hydride (NMH), a lithium-ion or lithium-polymer rechargeable battery of adequate size for the particular application. The battery provides an output to a power supply 424 to condition and regulate power to downstream circuits and the power supply output is coupled to a power control circuit 426 for distributing power to various local components. The power circuit 420 further includes a charging device 428 and charger interface 430 for coupling the charging device 428 to an external power source 431. A charge indicator 432 provides an indication of amount of charge and/or charging time remaining for the power circuit 420. Such indicators are somewhat common and further description is not necessary here.

As described above, the external equipment interacts with the sensor station 208 to, in part, retrieve data from the memory module 408 and to charge the rechargeable batteries 323, 422. In one embodiment, a single cable 400 includes a data conductor that transmits data between the external equipment and the memory module 408 and other components of the sensor station 208 and a power conductor that transfers electrical power from an external source to the power circuit 420. The cable 440, which can be formed of metal wire or optical fibers, provides a consolidated connection device for operatively connecting the sensor station 208 to one or more external devices. The sensor station 208 can also include one or more external batteries.

Another optional feature is a wake up circuit 444 that allows the wireless station unit to control power consumption from the battery throughout different operating modes. The wake up circuit 444 can be triggered from a number of specified sources; the radio receiver 412, the clock 438, a motion sensor or environmental condition sensor (not shown). Still another optional feature is a wireless station unit 400 that includes a motion sensor 440 to detect unwanted movement of the station unit or to detect around the station unit, in which a proximity sensor might be used. Such unwanted movement might be caused by wildlife interfering with the unit, soil movement or the like.

Location parameters, which include latitude, longitude, azimuth, inclination, elevation, heading (e.g., relative to north), tilt relative to gravity, etc., associated with a particular sensor unit 320 help to correlate data acquired during a survey. These parameters determined prior to a survey and are stored in a memory 303, 408 in the central controller and/or in the station unit 400. The sensor units 320 can be affected by their orientation in all three dimensions. Thus, if a measured orientation of a given sensor unit 320 is inaccurate or has been omitted, then the accuracy of the recorded data can be compromised. As will be described in greater detail below, embodiments of the present disclosure provide an efficient method of determining and recording location parameters such as orientation data for sensor units 320.

Figure 5:
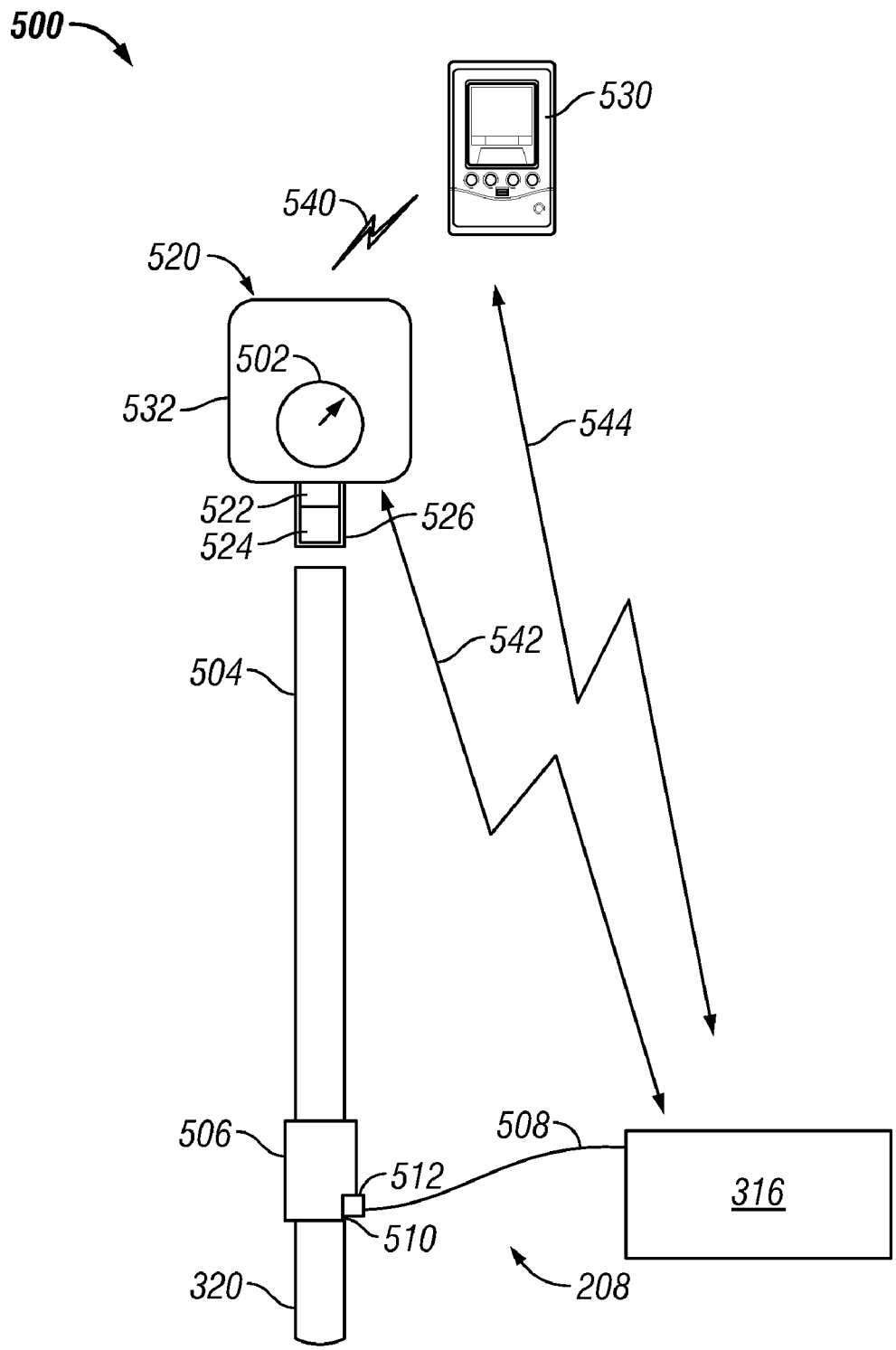
FIG. 5 illustrates one embodiment of an orientation measurement tool made in accordance with the present disclosure.

Referring now to FIG. 5, an orientation measurement tool 500 can be used to configure the sensor station 208, the sensors 102 (FIG. 1), the field boxes 103 (FIG. 1), or any other seismic device. This configuration may include transmitting one or more location parameters to the sensor station 208. The location parameters include, but are not limited to, heading, x and y coordinates, inclination/tilt and azimuth and elevation. This configuration may also include transmitting one or more processor executable instructions that may be used by the sensor station 208 to control one or more functions of the sensor station 208.

In one embodiment, the orientation measurement tool 500 includes an orientation sensor 502 and an alignment member 504. The orientation sensor 502 measures one or both of heading and tilt angle of a sensor unit 320 that has been placed into the ground. Exemplary orientation sensors include digital compasses, devices that can provide a measurement relative to a selected reference such as magnetic north, accelerometers, magnetometers, etc. Digital compasses are used in certain embodiment because such devices can provide accuracy to within 2.5 degrees. The alignment member 504 in one non-limiting embodiment is a tubular member that engages the sensor unit 320 with an end cap 506. The end cap 506 is formed such that the sensor unit 320 slides into the end cap 506 only when a preset angular alignment exists between the end cap 506 and the sensor unit 320. For example, in embodiments where a cable 508 extends out of the sensor unit 320, the end cap 506 can have a slot 510 formed to receive a fitting 512 associated with the cable 508. When the fitting 512 slides into the slot 510, the sensor unit 320 and the alignment member 504 are aligned in the desired manner. In other arrangements, the alignment member 504 and the sensor unit 320 can utilize pins, grooves, and other known mechanisms for causing a desired alignment there between.

In other embodiments, the alignment member 504 can be configured to actively determine the angular offset of the sensor unit 320 relative to a preset reference point. That is, instead of manipulating the alignment member 504 and/or the sensor unit 320 until a desired physical relative orientation exists, the alignment member 504 can include one or more sensors (not shown) that determine the angular orientation of the sensor unit 320. The determined angular orientation is then correlated with a heading reading for the orientation sensor 502.

It will be appreciated that the physical mating of the orientation sensor 502 with the sensor unit 320 increases the accuracy of the measured location parameters pertaining to the sensor unit 320 in at least two ways. First, because the orientation measurement tool 500 is positioned directly over the sensor unit 320, longitude and latitude measurements are assured of being as representative as possible of the true location of the sensor unit 320. Additionally, because of physical connection between the orientation measurement tool 500 and the sensor unit 320, human error that could arise in measuring a heading of the sensor unit 320 using a handheld device are also eliminated.

In embodiments, the orientation measurement tool 500 can include a pod 520 that houses the orientation sensor 502. The pod 520 can include associated support equipment such as a power supply 522 and a data transmission device 524. The data transmission device 524 in one embodiment wirelessly transmits heading data from the orientation sensor 502 to a processing unit 530 and/or the station unit 316 associated with the sensor unit 320. In other embodiments, the data transmission device 524 can use electrical and/or fiber optic conductors for data transmission.

The processing unit 530 is configured to store, transmit and receive data. In one configuration, the processing unit 530 can be portable digital assistant (PDA) which is a small hand-held device equipped with a microprocessor that is used especially for storing and organizing electronic data. In some arrangements, the processing unit can include a GPS device. In other arrangements, a GPS device can be a separate unit.

In embodiments, the pod 520 has a coupling end 526 that connects to an end of the alignment member 504 and a cradle portion 532 that supports the processing unit 530. Advantageously, the coupling end 526 can be detached from the alignment member 504 and attached to a mounting element (not shown) on a vehicle or other mobile platform. Alternatively, the pod 520 when disconnected from the alignment member 504 can be worn on the person. It will be appreciated that the pod 520 can operate as a self-contained navigation device that can be easily deployed by ground personnel in the field. It should be appreciated that compasses and GPS devices are merely illustrative of the types of sensors that can be integrated into a pod 520 or supported by the pod 520.

In an exemplary mode of deployment, each wireless sensor station 208 is transported to a predetermined spread location. Thus can be done utilizing a pod 520 having a GPS device and orientation sensor and that is detached from the alignment member 504. It should be appreciated that the detached pod 520 having such instruments may provide the user with precise information as to position (e.g., x, y coordinates) and heading, which can allow the user to readily navigate over survey area. Upon arriving at the location, the location parameters (e.g., latitude, longitude, azimuth, inclination, elevation, etc.) associated with the particular sensor unit 320 are determined using the orientation measurement tool 500. For instance, once the sensor unit 320 has been planted in the ground, the alignment member 504 is fitted onto the sensor unit 320. While in this position, the orientation device 502, such as a digital compass, obtains an accurate azimuth reading and wireless transmits that information via a wireless data link 540 to the processing unit 530. Alternatively or additionally, the information is transmitted to the station unit 316 via a suitable wireless data link 542. The wireless data link 542 may use radio signals, BLUE TOOTH technology, infrared signals or any other suitable wireless communication methodology. Additionally, the GPS device determines coordinates, which is also recorded in the processing unit 530. In arrangements where the location parameter data is transmitted to the processing unit 530, the processing unit 530 can thereafter transmit that location parameter data to the station unit 316 via a suitable wireless data link 544. The location parameter data may be stored in trace headers for each wireless station unit 316. It should be appreciated that the automated nature of the obtaining, recording and transferring location parameter data can provide more precise results when seismic data is processed.

As noted above, the orientation measurement tool 500 may be used to perform in-field configuration of the station unit 316. In one embodiment, the orientation measurement tool 500 may include a memory module (not shown) storing processor executable instructions that configures the station unit 316 to operate in a specified manner during the course of a given seismic data acquisition activity. For example, the orientation measurement tool 500 may load the station unit 316 with processor executable instructions that enables the station unit 316 to acquire seismic data in accordance with a pre-determined seismic data acquisition plan (e.g., a shot plan). In one arrangement, the orientation measurement tool 500 may load the station unit 316 with one or more configuration data files. During seismic data acquisition, one or more of these loaded configuration data files may be utilized by the station unit 316 to control the in-field behavior or operation of the station unit 316. The operation or behavior may be related to functions that include, but are not limited to, the measuring of seismic energy, the writing of data indicative of the measured seismic energy to a data storage medium, the response of the station unit 316 to an event or condition that may impact a functional aspect of the station unit 316 (i.e., an "out-of-norm" condition or event), and the protocols or method the station unit 316 uses to communication with other external devices. In some embodiments, the configuration data files may include acquisition parameters such as sample rates, record lengths, filter configurations, etc. The configuration data files may also include operational parameters such as alarm set points for low battery power, maximum operating temperature, maximum noise, etc. Thus, a station unit 316 may be configured to report one or more of these conditions such as low battery levels, excessive noise, once a preset threshold value for such a condition has been reached. Other operational parameters may include available communication frequencies that may be in a "look-up" table. The station unit 316 may reference the "look-up" table to select the most suitable frequency for signal transmission. Still another operational parameter may include a "shot template" that enables the station unit 316 to determine whether or not to change operating states to prepare for a given shot. For example, the "shot template" may be a mathematical expression or geometric shape that may be referenced by the station unit 316 to determine whether to record seismic data from a source that is to be activated. In some embodiments, the CSC 490 (FIG. 2) may transmit a signal that instructs the sensor stations 208 to select one configuration data file from a plurality of different configuration data files. Thus, the sensor stations 208 may be effectively reconfigured as desired while in the field.

It should be understood that the FIG. 5 embodiment is merely illustrative. For example, in certain embodiments, an inductive coupling or mating electrical or fiber optic contacts can be used to transmit or exchange data between the various sensors and processing units. Additionally, in certain other embodiments, a compass and a GPS device can be integrated into a single device or integrated into a single processing unit. In still other embodiments, the processing unit is not physically mated with the orientation device. For example, as described in co-pending application IO-1114, navigation devices can be used to provide a "heads-up" navigation to the user. Such devices can be worn in an ear piece or eye wear. In such embodiments, the compass device can transmit data via wire or wireless to the "heads-up" navigation devices worn by the user.

In embodiments, the orientation measurement tool 500 may include additional equipment of enhanced the ability of field personnel to navigate the terrain, maintain accurate logs of the equipment in the field, develop, and accurately position equipment. For example, the orientation measurement tool 500 may include a device configured to read bar codes or an RFID reader that is configured to scan hardware and assign some property to it (e.g., location, condition, associated hardware, etc.). Another device may be an imaging device such as a digital camera. For example, images of a deployed receiver, or other piece of equipment, may be used to develop a photographic log. Such a log may be useful for 4D applications to, for instance, replicate positions, as well as general quality control, e.g. a receiver may be planted in an undesirable location. The orientation measurement tool 500 may also be configured to receive data relating to property permitting. The permit process can often involve talking to land owners and marking out boundaries. This process could be administered by a permit agent and a database having permitting related information. In embodiments, the orientation measurement tool 500 may include instructions and databases used to measure and evaluation field crew operational metrics (e.g., productivity metrics). For example, the orientation measurement tool 500 may be configured to collect selected data that may be useful in identifying the occurrence of operational delays and bottlenecks in daily crew workflows. Events and tasks that may be contributing to such difficulties may be may be logged and time-stamped for later evaluation.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure. It is intended that the following claims be interpreted to embrace all such modifications and changes.

We claim:

1. A method for configuring a seismic device having a memory module and that is positioned in a geographical area of interest, comprising:
    planting the seismic device;
    mating the seismic device with a configuration tool that includes:
        a memory module;
        a processor in communication with the configuration tool memory module;
        at least one orientation sensor configured to determine an azimuth value for the seismic device;
        a location sensor configured to determine at least one coordinate for the seismic device; and
        a communication device operatively coupled to the processor
    determining the azimuth value and the at least one location parameter for the seismic device; and
    transmitting the determined azimuth value and the at least one coordinate to the seismic device memory module and in the configuration tool memory module.

2. The method of claim 1, further comprising storing, in the seismic device memory module and the configuration tool memory module, data selected from at least one of: (i) an elevation, and (ii) a z-coordinate.

3. The method of claim 1, further comprising transmitting processor-executable instructions to the seismic device memory module by using the communication device.

4. The method of claim 1, wherein the at least one orientation sensor is a compass.

5. The method apparatus claim 4, further comprising a second orientation sensor configured to determine one of: (i) inclination, and (ii) tilt, and further comprising transmitting data from the second orientation sensor to the seismic device.

6. The method of claim 1, wherein the location sensor is a GPS device.

7. A method for configuring a seismic device, comprising:
determining an azimuth value for the seismic device in a geographical area of interest using at least one orientation sensor;
positioning the at least one orientation sensor on an alignment member;
mating the alignment member with the seismic device such that the at least one orientation sensor and the seismic device has a desired angular alignment; and
transmitting the determined azimuth value and data associated with the seismic device to the seismic device.

8. The method of claim 7, wherein the data includes one of: (i) an elevation and (ii) a z-coordinate.

9. The method of claim 7, wherein the data includes processor-executable instructions.

10. The method of claim 7, wherein the seismic device is a sensor station.

11. The method of claim 7, further comprising:
determining at least one location parameter for the seismic device; and
transmitting the determined at least one location parameter to the seismic device.

12. The method of claim 11, further comprising:
using a GPS device to determine the at least one location parameter.

13. The method of claim 7, further comprising:
transporting a processor to the geographical area of interest, the processor being programmed to configure the seismic device; and
positioning the processor proximate to the seismic device.

14. An apparatus for configuring a seismic device positioned in a geographical area of interest, comprising:
a memory module;
a processor configured to transmit data to the memory module;
at least one orientation sensor configured to determine an azimuth value for the seismic device;
an alignment member azimuthally aligning the at least one orientation sensor and the seismic device; and
a communication device operatively coupled to the processor, the communication device transmitting the determined azimuth value to the seismic device.

15. The apparatus of claim 14, wherein the data includes processor-executable instructions.

16. The apparatus of claim 14, wherein the seismic device is a sensor station, and wherein the communication device is configured to transmit the determined azimuth value and the retrieved data to the sensor station.

17. The apparatus of claim 14, wherein the at least one orientation sensor is a compass, the processor being in communication with the at least one orientation sensor.

18. The apparatus of claim 17, further comprising a second orientation sensor configured to determine one of: (i) inclination, and (ii) tilt, wherein the communication device is configured to transmit data from the second orientation sensor to the seismic device.

19. The apparatus of claim 14, further comprising a GPS device.

20. The apparatus of claim 14, wherein the memory module stores one of: (i) an elevation and (ii) a z-coordinate.

* * * * *